United States Patent Office 3,365,481
Patented Jan. 23, 1968

3,365,481
PROCESS FOR THE PRODUCTION OF α,β-UNSATURATED CARBONYL COMPOUNDS
Georg Wittig, Heidelberg, and Walter Stilz and Horst Pommer, Ludwigshafen (Rhine), Germany, assignors to Badische Anilin- & Soda-Fabrik Aktiengesellschaft, Ludwigshafen (Rhine), Germany
No Drawing. Filed Oct. 2, 1963, Ser. No. 313,155
Claims priority, application Germany, Mar. 29, 1963,
B 71,337; B 71,421
3 Claims. (Cl. 260—456)

This invention relates to a new process for the production of α,β-unsaturated carbonyl compounds, such as aldehydes and ketones.

In these formulae $R_1$, $R_2$, $R_3$ and $R_4$ denote hydrogen or an aliphatic, cycloaliphatic, araliphatic or aromatic radical. $R_5$ has the same meaning as $R_1$ to $R_4$, but may also be an aliphatic or aromatic group attached by way of an oxygen atom or a (—NH—) group. $R_1$, $R_2$, $R_3$ and $R_4$ may by pairs be members of a five- or six-membered ring. Furthermore, $R_1$ and $R_3$ may each contain another ($>C=O$) grouping or ($>C=N-$) grouping, as is shown by the reaction of terephthalaldehyde with N-cyclohexylacetaldimine in the presence of lithium diisopropylamide

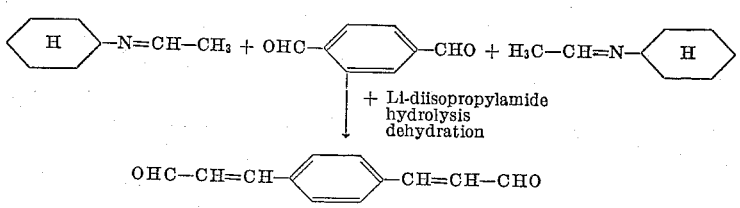

| + Li-diisopropylamide
| hydrolysis
↓ dehydration

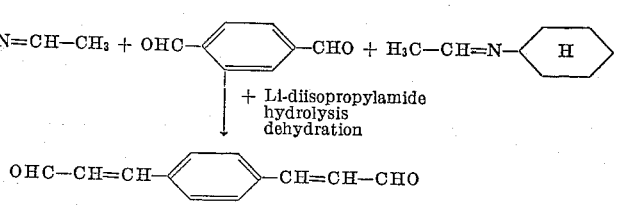

It is known that α,β-unsaturated aldehydes of complicated structure cannot be satisfactorily synthesized via an aldol condensation with two different aldehydes as mixtures of different compounds are always obtained. T. M. Patrick, Jr., J.A.C.S., 74, 2984 (1962), has reported that the reaction of an aldehyde with its own aldimine yields dihydropyridine derivatives and not a single aldol. A number of condensation reactions among the carotenoids have also be described in which imines containing activated methylene groups react exclusively with elimination of the nitrogen-containing group in the form of ammonia or amine. It was therefore to be expected that the use of imines in place of aldehydes or ketones in aldol condensations would yield further byproducts or be conducive to the formation of compounds produced by elimination of the imine group.

It is an object of our invention to provide a new and simple process which can be widely used for the production of α,β-unsaturated aldehydes and ketones. Since such carbonyl compounds are of extreme importance in the making of carotenoids and related substances it is a specific object of our invention to make the said compounds accessible in an easier and more economic manner than has heretofore been possible.

We have found that α,β-unsaturated carbonyl compounds are obtained in a surprisingly advantageous manner by reacting carbonyl compounds, in the presence of proton acceptors containing metal, with such derivatives of carbonyl compounds as contain a ($>C=N-$) group in place of the ($>C=O$) group and moreover contain a (—CH$_2$—) group vicinal to the imino carbon atom and then dehydrating and hydrolizing the reaction product.

The process according to our invention will now be described, by way of example, with reference to the following formulae, these formulae illustrating the reaction of a monovalent carbonyl compound (I) with the derivative of a monovalent carbonyl compound which contains a ($>C=N-$) group instead of the ($>C=O-$) group:

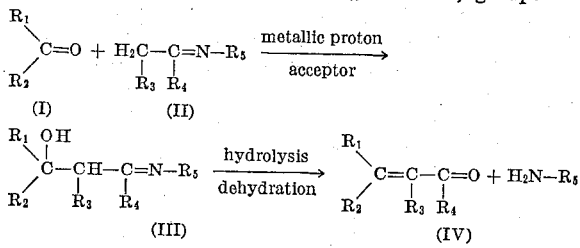

Suitable starting materials (Type I) for the new process are all aldehydes ($R_2$=H) and ketones ($R_2$≠H) provided that the greater portion of the aldehydes and ketones is not in the enol form. Examples are saturated aliphatic aldehydes, such as formaldehyde, acetaldehyde, glyoxylic esters and esters and ethers of glycolic aldehyde; aliphatic saturated dialdehydes, such as glyoxal and methylglyoxal; aliphatic unsaturated aldehydes, such as acrolein, methacrolein, crotonaldehyde, β-methylcrotonaldehyde, β-formyl crotonic acid and their salts and esters, and tiglaldehyde; aliphatic unsaturated aldehydes with conjugated double bonds, such as sorbaldehyde, citral, cyclocitral, β-ionylideneacetaldehyde, vitamin A aldehyde, δ-formyl sorbic acid and 3-methyl-7-formyloctatrien-(2,4,6)-monocarboxylic acid; aliphatic unsaturated dialdehydes, such as maleic dialdehyde, aliphatic unsaturated dialdehydes with conjugated double bonds, such as 2,7-dimethyloctadien-(2,6)-ine-(4)-dial-(1,8) and 2,7-dimethyloctatrien-(2,4,6)-dial-(1,8); aromatic aldehydes, such as benzaldehyde and 2,6-dichloro-benzaldehyde; aromatic dialdehydes, such as terephthaldialdehyde; araliphatic aldehydes, such as cinnamaldehyde and phenylpentadienal; aliphatic saturated ketones, such as acetone, methoxyacetone and hydroxyacetone, aliphatic unsaturated ketones, such as vinyl methyl ketone, methylheptenone, ionone, pseudoionone and β-acetyl acrylic acid; unsaturated aliphatic ketones with conjugated double bonds, such as 2,6,9-trimethylpentadecapentaen-(2,6,8,10,12)-one-(14), 8-[2',6', 6' - trimethylcyclohexen-(1')-yl-(1')]-6-methyloctatrien-(3,5,7)-one-(2), 8 - [2',6',6'-trimethylcyclohexadien-(1', 3')-yl-(1')]-6-methyloctatrien-(3,5,7)-one-(2), 8-[2',6', 6'-trimethyl-4-acetoxycyclohexen - (1') - yl - (1')] - 6-methyloctatrien-(3,5,7)-one-(2), 1,1-dialkoxy-2-methylhepatadien-(2,4)-one-(6), 2-methyl-5-acetylpentadien-(2, 4)-monocarboxylic acid and 4-methyl-7-acetylheptatrien-(2,4,6)-monocarboxylic acid and their salts and esters; aliphatic-aromatic ketones, such as acetophenone; aromatic ketones, such as benzophenone and Michler's ketone and cyclic ketones, such as cyclohexanone and fluorenone.

Suitable derivatives of carbonyl compounds in which the ($>C=O-$) group is replaced by a ($>C=N-$) group (Type II) and which contain a methylene group vicinal to the iminocarbon atom are the reaction products of mono- or polyvalent aldehydes or ketones with aliphatic, cycloaliphatic, araliphatic and aromatic amines, hydrazines or the oxygen derivatives of hydroxylamine.

The aldimines and ketimines made from acetaldehyde, propionaldehyde, crotonaldehyde, β - methylcrotonaldehyde, glyoxal, terephthalaldehyde, acetone and cyclohexanone on the one hand and cyclohexylamine on the other hand are particularly suitable. These compounds are also termed Schiff bases or alkylidenimines.

As is shown by the list of compounds (I) and (II) these compounds can either be hydrocarbon or many bear the most varied substituents, for example halogen, such as chlorine and bromine, as well as hydroxyl, alkoxy, sulfonyl, sulfonic ester, carboxyl, carboxylic ester and nitrile groups.

It is emphasized here that the invention does not reside in the manufacture of certain substances part of which are new and widely applicable, but in the provision of a new and widely applicable chemical process. For this reason it is impossible to give an exhaustive list of the compounds (I) and (II) suitable as starting materials for the process according to our invention and those herein referred to are given by way of example only. Nor is it necessary to give a complete list, because anyone skilled in the art, by applying the teaching herein provided, will be able to select and use the starting compounds suitable for the synthesis of $\alpha,\beta$-unsaturated carbonyl compounds.

Suitable metal-containing proton acceptors are organometallic compounds such as lithium methyl, lithium phenyl, lithium butyl, sodium phenyl, alkali acetylene compounds and Grignard compounds. Since it cannot be excluded that certain organo-metallic compounds may react to a not negligible extent with the imino compound at the double bond and since the tendency to such side reactions depends on factors which cannot be completely foreseen, preliminary trials should be carried out under the reaction conditions envisaged to determine whether these conditions are completely satisfactory. Organometallic compounds showing steric hindrance have no or practically no tendency to undergo addition reactions of this type. They are therefore preferred, in particular, when they lose their metal atom readily with the acceptance of a proton. The alcoholates and hydroxyl compounds of the metals of groups 1 to 3 of the periodic system are suitable proton acceptors. Compounds of the alkali metals with organic amines and ammonia are particularly suitable. Examples of such compounds are lithium amide, sodamide, potassamide, lithium diisopropylamide, lithium diethylamide and lithium piperidide.

The process is carried out preferably in a solvent from which it may be necessary to exclude water depending on the stability of the nitrogen-containing components of the reaction. Solvents which are particularly suitable are ethers, such as diethyl ether, tetrahydrofuran and dioxan; hydrocarbons, such as hexane, octane, cyclohexane, benzene and toluene, and liquid ammonia, dimethylformamide, N-methylpyrrolidone and dimethylsulfoxide.

Generally speaking, it is recommendable to use all reactants in equivalent amounts, but it will in many cases be advantageous to use the carbonyl compound (I) in excess in order to accelerate the reaction.

The reaction temperature can vary within wide limits; the reaction is preferably carried out in the range between room temperature and —70° C. It is also advantageous to carry out the reaction in an atmosphere of an inert gas.

After completion of the reaction the addition products formed can be isolated or hydrolyzed and dehydrated without isolation by a known method, as, for example, in alkaline or preferably acid solution.

As a primary reaction product $\beta$-hydroxyimino compounds (IIIa) are obtained according to the following simplified but generally applicable scheme

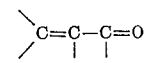

In most cases these compounds can be well isolated. If the products containing the grouping (IIIa) are treated with aqueous alkali, an intermediate compound (IIIb) of the formula

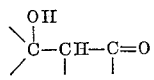

can often be isolated. However, if they are treated with acids, there are obtained in most cases, by simultaneous hydrolysis and dehydration, the $\alpha,\beta$-unsaturated carbonyl compounds of the general Formula IVa $$\diagdown\!\!\!\!C\!\!=\!\!C\!\!-\!\!C\!\!=\!\!O\diagup$$

The conditions required for hydrolysis and dehydration are generally known and depend on the nature of the starting compounds used. In some cases, it is sufficient to treat the products with dilute acids at room temperature for a short time, while in other cases it is necessary to heat them to the boil with concentrated acids for a prolonged period of time.

Processing of the reaction mixtures and isolation of the products obtained are carried out by conventional methods which need not be described in detail here; it is advantageous to isolate $\alpha,\beta$-unsaturated carbonyl compounds of low molecular weight by distillation and those of high molecular weight by recrystallization.

The new process provides a generally applicable method for the synthesis of numerous compounds. Reference is made here to certain new methods for the synthesis of the very important carotenoids as examples. Thus, citral is obtained from N-cyclohexyl acetaldimine and methylheptenone, $\beta$-ionylidenacetaldehyde from the same acetaldimine and $\beta$-ionone, vitamin A aldehyde from the same acetaldimine and 8-[2',6',6'-trimethylcyclohexen-(1')-yl-(1')], 6-methyl octatrien-(3,5,7)-one-(2) ($C_{18}$ ketone), $\beta$-ionone from the N-cyclohexyl acetonimine and cyclocitral ($C_{18}$ ketone) from the same acetonimine and $\beta$-ionylideneacetaldehyde, $\beta$-ionylidene acetaldehyde from N-methyl-$\beta$-methylcrotonaldimine and cyclocitral and vitamin A aldehyde from the same $\beta$-methylcrotonaldimine and $\beta$-ionylideneacetaldehyde.

$\beta$-Apo-8'-carotenal which is an important food dye can be produced starting from N-cyclohexyl acetaldimine and vitamin A aldehyde. The resulting $C_{22}$ aldehyde is reacted with N-cyclohexyl propionaldimine yielding the $C_{25}$ aldehyde. The $C_{25}$ aldehyde is reacted with the said acetaldimine yielding the $C_{27}$ aldehyde which is then reacted with the said propionaldimine yielding $\beta$-apo-8'-carotenal.

Conjugated unsaturated compounds in general may advantageously be built up in this way.

Further dialdehydes, which can be produced according to this method, are in their turn starting materials for known carotenoid syntheses. Thus, 4,9-dimethyldodecapentaen-(2,4,6,8,10)-dial-(1,10), ($C_{14}$ dialdehyde), is obtained by reacting two moles of an acetaldimine with 2,7-dimethyloctatrien-2,4,6-dial-(1,8), ($C_{10}$ dialdehyde). The $C_{20}$ dialdehyde (crocetin dialdehyde) can be obtained from the reaction product by treatment with a propionaldimine by the same method. The double bond in the middle of the chain can be replaced by a triple bond.

In a similar way members of the vitamin $A_2$ series, the zeaxanthine series and open-chain carotenoids, etc. can be prepared. In these syntheses the methyl groups are introduced at the desired position in the chain by suitable modification of the imine component.

The process as described in this invention is of particular importance for the production of conjugated unsaturated compounds which contain one of the following residues once or twice or contain one of each of these residues:

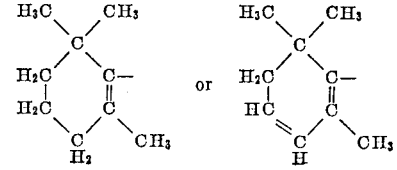

or

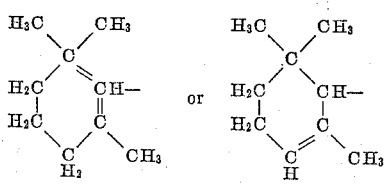

Although the process according to our invention is particularly important for the reaction of carbonyl compounds (I) with those imino compounds (II) which are not derived from the said carbonyl compounds (I), it is also important if (II) is an imino compound of (I). True, in this case an aldol condensation of (I) with (I) would also lead to the desired result, but this condensation would proceed at lower speed and give end products of lower purity, since aldol condensations, as is known, proceed into mixtures of dimeric, trimeric and oligomeric products in a manner which is difficult to control.

The quantities given in the examples in parts and percent are parts and percent by weight unless otherwise stated. Parts by weight bear the same relation to parts by volume as the gram to the milliliter.

EXAMPLE 1

28 parts of ethylidenecyclohexylimine is added to 500 parts by volume of a 0.5 molar solution of lithium diisopropylamide in ether at 0° C. in an atmosphere of nitrogen. The mixture is cooled to —20° C., 26.6 parts benzaldehyde added slowly and the mixture allowed to stand for 24 hours at room temperature. 250 parts by volume of 20% sulfuric acid is then added at —70° C. and the resulting mixture subjected to steam distillation. The organic phase of the distillate is separated off and distilled. 26 parts of cinnamaldehyde, boiling point 117 to 120° C. at a pressure of 12 mm. Hg, is obtained.

EXAMPLE 2

25 parts by volume of a molar solution of lithium methyl in ether is added to a mixture of 2.6 parts of diisopropylamine and 25 parts by volume of absolute ether in an atmosphere of nitrogen. The mixture is cooled to 0° C. and 2.8 parts of ethylidenecyclohexylimine added. The reaction mixture is then cooled to —40° C. and treated with 25 parts by volume of a molar solution of benzophenone in ether. The mixture is allowed to stand for 1 hour at room temperature and then water is added at 0° C. The precipitate is filtered off, the filtrate concentrated in vacuo and treated with petroleum ether yielding a further precipitate. The combined precipitates are recrystallized from benzene-petroleum ether. 7 parts of N-(3,3 - diphenyl-3-hydroxypropylidene)-cyclohexylimine, M.P. 127 to 128° C., is obtained.

Some further reactions have been carried out in a similar way as indicated below.

(a) N-(3,3 - diphenyl - 3 - hydroxy-2-methylpropylidene) - cyclohexylimine, M.P. 82 to 83° C., was obtained in a yield of 91% from benzophenone and propylidenecyclohexylimine.

(b) N - (5,5 - diphenyl  5 - hydroxypentene-(2)-ylidene - (1)) - cyclohexylimine, M.P. 156 to 157° C., was obtained in a yield of 76% from benzophenone and crotylidenecyclohexylimine.

(c) N - (3 - phenyl - 3 - hydroxypropylidene)-cyclohexylimine, M.P. 79 to 80° C., was obtained in a yield of 94% from benzaldehyde and ethylidenecyclohexylimine.

(d) N - [5 - (2',6',6' - trimethylcyclohexene-(1')-yl-(1')) - 3 - methyl-3-hydroxypentene - (4) - ylidene-(1)] - cyclohexylimine, M.P. 46 to 47° C., was obtained in a yield of 80% from β-ionone and ethylidenecyclohexylimine.

(e) N - (3 - phenyl-3-hydroxybutylidene-(1))-cyclohexylimine, M.P. 60 to 61° C., was obtained in a yield of 80% from acetophenone and ethylidenecyclohexylimine.

The corresponding β-unsaturated aldehydes can be obtained from these adducts by hydrolysis as, for example, by heating 1.55 parts of N-(3,3 - diphenyl-3-hydroxypropylidene) - cyclohexylimine in 100 parts by volume of 2 N sulfuric acid on the water bath for 3 hours. The reaction mixture is cooled, extracted with ether, the extract dried with sodium sulfate and the ether distilled off in vacuo. The oily residue crystallizes after a short time and is recrystallized from petroleum ether. 0.8 part of β-phenylcinnamaldehyde, M.P. 45 to 46° C., is obtained.

EXAMPLE 3

12.5 parts of ethylidenecyclohexylimine is added slowly to 200 parts by volume of an 0.5 molar ethereal solution of lithium diisopropylamide in an atmosphere of nitrogen at 0° C. The reaction mixture is cooled to —50° C., 19.2 parts of β-ionone added and the mixture allowed to stand for 1 hour at room temperature. The reaction mixture is treated with ice-water at 0° C. and cautiously acidified with 20% acetic acid. After standing for 20 hours the liquid is washed with bicarbonate solution and water and the ethereal layer separated off. The ethereal solution is dried with sodium sulfate and the ether then distilled off. The residue is distilled and approx. 11 parts of β-ionylideneacetaldehyde, boiling point 110 to 120° C./10⁻³ at a pressure of $10^{-3}$ mm. Hg, is obtained.

EXAMPLE 4

12.5 parts ethylidenecyclohexylimine and 9.8 parts cyclohexanone are added to a mixture of 50 parts by volume absolute ether, 10 parts diisopropylamine and 91 parts by volume of a 1.1 molar ethereal solution of lithium methyl at 0° C. in an atmosphere of nitrogen. Water is then added, the ethereal layer separated off and dried over sodium sulfate. The ether is distilled off in vacuo and the residue treated with petroleum ether and cooled to —70° C. The colorless crystals which separate out are filtered off and a yield of 92% of β-[1'-hydroxycyclohexyl - (1')] - ethylidenecyclohexylimine, M.P. 62 to 62.5° C., is obtained.

The reaction product is treated with excess oxalic acid and the mixture subjected to steam distillation. After working up the distillate in the usual way a yield of 58% of cyclohexylideneacetaldehyde, B.P. 92° C., 2,4-dinitrophenylhydrazone, M.P. 198 to 200° C., semicarbazone, M.P. 208 to 209° C. (dec.), is obtained.

EXAMPLE 5

12.5 parts of ethylidenecyclohexylimine is added to 200 parts by volume of a 0.5 molar ethereal solution of lithium diisopropylamide in an atmosphere of nitrogen at 0° C. After standing for 20 minutes the mixture is cooled to —50° C., treated with 12 parts of acetophenone and allowed to stand for 4 hours at room temperature. 150 parts oxalic acid are added at 0° C. and the mixture submitted to steam distillation. The distillate is treated with sodium chloride and extracted with ether. The extract is worked up in the usual way and β-phenylcrotonaldehyde, B.P. 125 to 130° C. at a pressure of 13 mm. Hg, is obtained in a yield of 65%.

EXAMPLE 6

To a solution of 3.03 parts of diisopropylamine in 50 parts by volume of anhydrous ether 30 parts by volume of a 1 molar ethereal solution of methyl lithium is added, in the absence of atmospheric oxygen. When methane ceases to be developed, 3.75 parts of ethylidenecyclohexylimine dissolved in a little ether and then 5.45 parts of benzophenone also dissolved in a little ether are added at —20° C. while stirring, a white deposit being formed.

After stirring the reaction mixture for another hour 15 parts of water are added and the N-(3,3 - diphenyl-3- hydroxypropylidene - 1)-cyclohexylimine formed during hydrolysis is stripped by conventional manner. The yield is 91% of the theory with reference to ethylidenecyclohexylimine.

When using piperidine, instead of diisopropylamine, in stoichiometric quantity, the yield will be 95%.

When using 2 N hydrochloric acid, instead of water, for hydrolysis, cyclohexylamine is eliminated from the original reaction product, 3,3-diphenyl-3-hydroxypropionaldehyde being obtained in a yield of 89%.

EXAMPLES 7 TO 13

When working in the manner described in the first paragraph of Example 6.

(7) N - (3,3 - diphenyl - 3 - hydroxy - 1 - methylpropylidene-1)-cyclohexylimine with the melting point 72° to 74° C. is obtained from 4.17 parts of isopropylidenecyclohexylimine and 5.46 parts of benzophenone in a yield of 42%;

(8) N - (3,3 - diphenyl - 3 - hydroxy - 2 - ethylpropylidene-1)-cyclohexylimine with the melting point 92° to 94° C. is obtained from 4.59 parts of n-butylidenecyclohexylimine and 5.46 parts of benzophenone in a yield of 89%;

(9) N - (3,3 - diphenyl - 3 - hydroxy - 2,2 - dimethylpropylidene-1)-cyclohexylimine with the melting point 89° to 91° C. is obtained from 4.59 parts of isobutylidenecyclohexylimine and 5.46 parts of benzophenone in a yield of 39;

(10) N - (3 - phenyl - 3 - methyl - 3 - hydroxy - 2 - methylpropylidene)-cyclohexylimine with the melting point 86° to 87° C. is obtained from 4.57 parts of propylidenecyclohexylimine and 3.60 parts of acetophenone in a yield of 65%;

(11) N - (3 - phenyl - 3 - methyl - 3 - hydroxy - 2 - ethylpropylidene-1)-cyclohexylimine with the melting point 109° to 111° C. is obtained from 4.59 parts of n-butylidenecyclohexylimine and 3.60 parts of acetophenone in a yield of 45%;

(12) The compound

having the melting point 108° to 111° C. is obtained from 3.75 parts of ethylidenecyclohexylimine and 2.01 parts of terephthalaldehyde in a yield of 55%;

(13) N - (3 - fluorenyl (9') - 3 - hydroxypropylidene-1)-cyclohexylimine with the melting point 81° to 83° C. is obtained from 3.75 parts of ethylidenecyclohexylimine and 5.46 parts of fluorenone in a yield of 32%.

The corresponding carbonyl compounds are obtained in conventional manner by hydrolysis and dehydration of the said intermediate products.

EXAMPLE 14

3.9 parts of potassium is dissolved in 200 parts of liquid ammonia in the presence of a small quantity of ferric chloride and to this solution 200 parts of absolute ether is added. The excess ammonia is then allowed to evaporate, and to the remaining potassium amide suspension 12.5 parts of ethylidenecyclohexylimine is added while stirring and, after stirring for another 40 minutes, a solution of 18.2 parts of benzophenone and 100 parts of ether is added.

The reaction product is then hydrolyzed and further processed as indicated in Example 6, 3,3-diphenyl-3-hydroxy propionaldehyde being obtained in 61% yield.

EXAMPLE 15

To an ethereal solution of 3.75 parts of 6-methylheptene-5-on(2) an ethereal solution of the reaction product of 4.17 parts of propylidene-(1) cyclohexylimine and 24 parts of lithiumdiisopropylamide is added at 0° C. The mixture is stirred for 90 minutes, hydrolyzed with excess glacial acetic acid and simultaneously desaminated and dehydrated. After shaking the mixture with water 2,3,7-trimethyloctadien-(2,6)-al-(1)-α-methylcitral is isolated from the ether phase by distillation in a yield of 62% of the theory.

EXAMPLE 16

5.45 parts of an ethereal solution of benzophenone is added to an ethereal solution of the reaction product of 6.03 parts of 1-phenylethylidenecyclohexylimine and 3.24 parts of lithiumdiisopropylamide at 0° C. After hydrolyzing the mixture thus obtained and processing it in conventional manner N-(1,3,3-triphenyl-3-hydroxypropylidene-1)-cyclohexylimine is obtained in a yield of 73%. Desamination and dehydration with 2 N sulfuric acid give 1,3,3-triphenylpropenone (M.P. 83° to 85° C.).

EXAMPLE 17

An ethereal solution of the reaction product of 3.24 parts of lithiumdiisopropylamide and 3.75 parts of ethylidenecyclohexylimine is combined with 6.25 parts of the sodium salt of benzaldehyde-o-sulfonic acid. After stirring the mixture for 90 minutes water is added and the mixture is then further processed in the manner described in the foregoing examples, N(3,2'-sulfophenylpropylidene-1) cyclohexylimine, which melts at 255° to 258° C. with decomposition, being obtained in a yield of 52%.

The corresponding carbonyl compound is obtained by hydrolysis and dehydration.

We claim:

1. A process for the production of α,β-unsaturated aldehydes and ketones of the formula

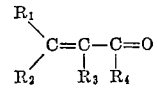

in which $R_1$, $R_2$, $R_3$ and $R_4$ denote hydrogen or a hydrocarbon aliphatic, cycloaliphatic, araliphatic or aromatic radical and in which $R_1$ and $R_2$ together, and $R_3$ and $R_4$ together can form a five- or six-membered ring or in which said hydrocarbon radicals bear halogen atoms or hydroxyl, alkoxy, sulfonyl, sulfonic ester, carboxyl, carboxylic ester, amino or nitrile groups as substituents, which comprises reacting between —70° C. and room temperature an aldehyde or ketone of the Formula I:

in the presence of a member of the group consisting of hydroxides of the metals of groups 1 to 3 of the periodic system, alkali metals with ammonia, lithium methyl, lithium phenyl, lithium butyl, sodium phenyl, lithium acetylene compounds, lithium diisopropylamide, lithium diethylamide and lithium piperidide, with a compound of the Formula II:

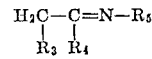

in which $R_5$ has the same meaning as $R_1$, and dehydrating and hydrolyzing the primarily formed intermediate of the Formula III:

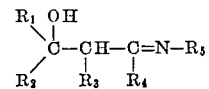

2. A process as claimed in claim 1, in which Compound I is selected from the group consisting of formaldehyde, acetaldehyde, glyoxylic esters, glycolic aldehyde, ethers and esters of glycolic aldehyde, crotonaldehyde, β-methylcrotonaldehyde, acrolein, methacrolein, tiglaldehyde, sorbaldehyde, benzaldehyde, cinnamaldehyde, 2,6-dichlorobenzaldehyde, phenylpentadienal, citral, cyclocitral, β-ionylidenacetaldehyde, vitamin-A aldehyde, glyoxal, maleindialdehyde, 2,7-dimethyloctadien-(2,6)-ine-(4)-dial-(1,8), the salts and esters of β-formylcrotonic acid, δ-formylsorbic acid, 3-methyl-7-formyloctatrien-(2,4,6)-monocarboxylic acid and benzaldehyde o-sulfonic acid, acetone, acetophenone, benzophenone, methoxyacetone, hydroxyacetone, vinylmethyl ketone, fluorenone, cyclohexanone, Michler's ketone, 2,6,9-trimethylpentadecapentaen-(2,6,8,10,12)-one-(14), 8-[2',6',6'-trimethylcyclohexen-(1')-yl-(1')]-6 - methyloctatrien-(3,5,7) - one-(2), 8-[2',6',6'-trimethylcyclohexadien-(1',3')-yl-(1')]-6-methyloctatrien-(3,5,7)-one-(2), 8 - [2',6',6'-trimethyl-4-aceto-oxycyclohexen-(1')-yl-(1')]-6-methyloctatrien-(3,5,7)-one-(2), methylheptenone, β-ionone, pseudoionone, 1,1-dialkoxy-2-methylheptadien-(2,4)-one-(6) and 4-methyl-7-acetylheptatrien-(2,4,6)-monocarboxylic acid.

3. A process as claimed in claim 1, in which Compound II is selected from the group consisting of a reaction product of a primary amine $R_5$—$NH_2$ with acetaldehyde, propionaldehyde, crotonaldehyde, β-methyl crotonaldehyde, glyoxal, terephthal aldehyde, acetone and cyclohexanone.

References Cited
UNITED STATES PATENTS 2,692,284  10/1954  Haury _____ 260—566
3,153,089  10/1964  Ameen _____ 260—566

OTHER REFERENCES

Patrick, Jr., J. Am. Chem. Soc., 74, 2984–2986 (1962).

DANIEL D. HORWITZ, *Primary Examiner.*